United States Patent [19]

Gooch

[11] 3,965,925
[45] June 29, 1976

[54] PINCH VALVE

[75] Inventor: John Henry Gooch, Hassocks, England

[73] Assignee: J. H. Gooch & Company Limited, Hassocks, England

[22] Filed: Mar. 17, 1975

[21] Appl. No.: 558,892

[30] Foreign Application Priority Data
Mar. 18, 1974 United Kingdom............. 11817/74

[52] U.S. Cl.................................. 137/451; 251/4; 251/342
[51] Int. Cl.²....................................... F16K 7/06
[58] Field of Search.............. 251/4, 6, 7, 9, 10, 251/340, 342; 138/45; 137/451

[56] References Cited
UNITED STATES PATENTS

| | | | |
|---|---|---|---|
| 2,883,150 | 4/1959 | Musser | 251/340 |
| 2,987,292 | 6/1961 | Teson et al. | 251/6 |

FOREIGN PATENTS OR APPLICATIONS

| | | | |
|---|---|---|---|
| 269,907 | 3/1913 | Germany | 251/4 |
| 268,933 | 9/1950 | Switzerland | 251/9 |
| 23,507 | 11/1898 | United Kingdom | 251/4 |
| 917,803 | 2/1963 | United Kingdom | 251/4 |

Primary Examiner—William R. Cline
Assistant Examiner—Richard Gerard

[57] ABSTRACT

A pinch valve has a tubular resilient sleeve with at least one transversely elongate aperture extending through it that is opened and closed by a control member having elements engaging diametrically opposite regions of the sleeve. The control member is rotatable on the sleeve between one angular position in which said elements engage regions of the sleeve substantially co-incident with the transverse longitudinal axis of said aperture to hold the aperture open, and another angular position in which the elements engage opposite regions transverse to said axis to squeeze said aperture closed.

15 Claims, 12 Drawing Figures

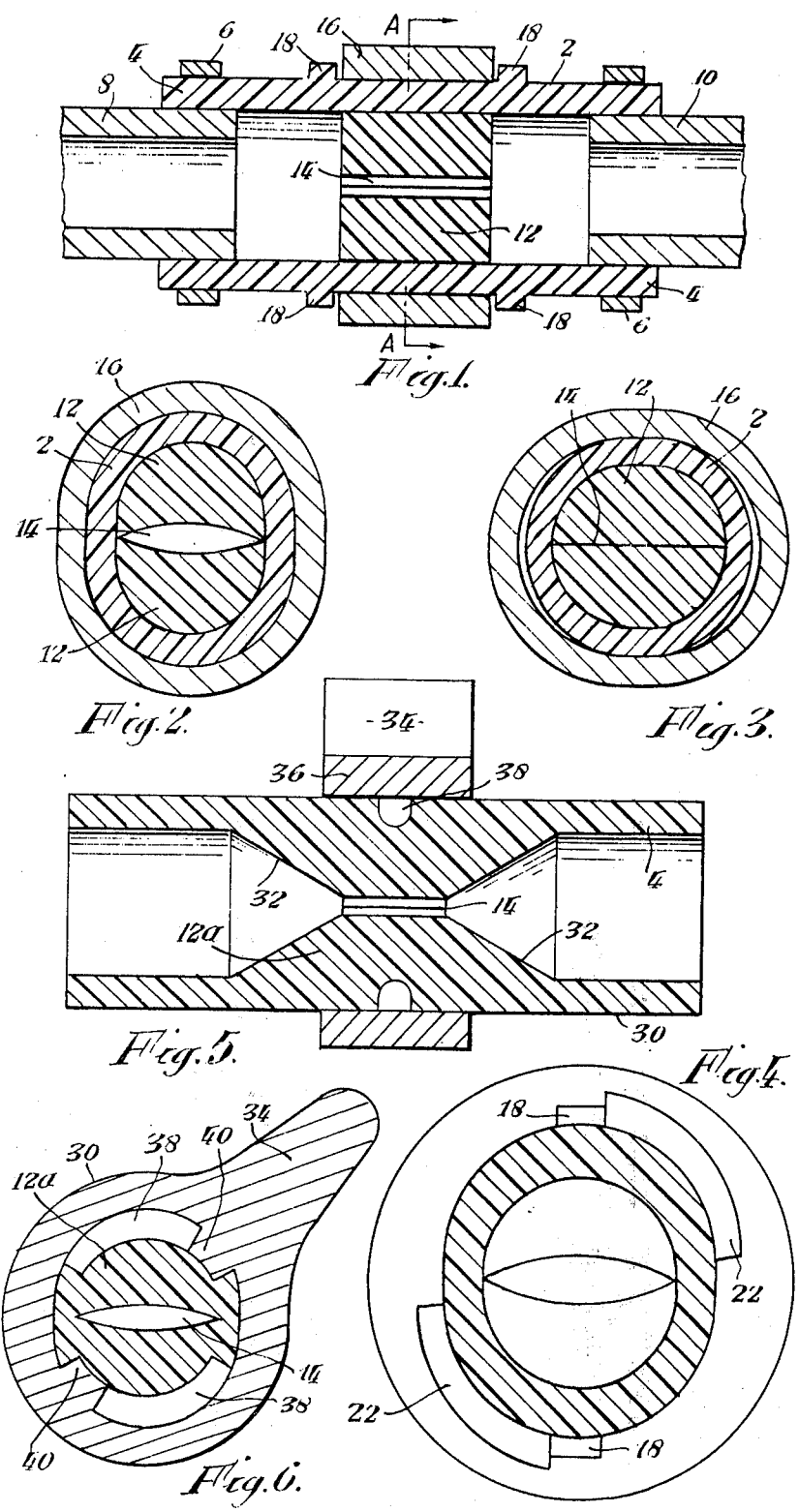

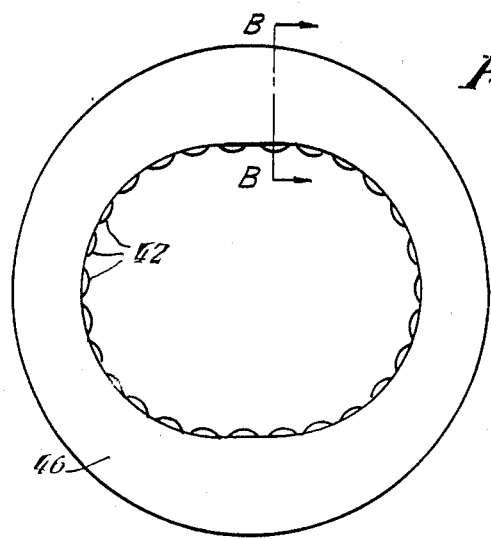
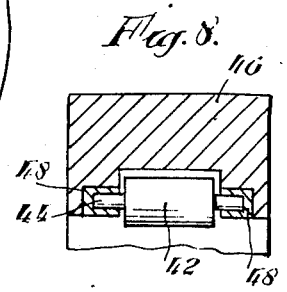
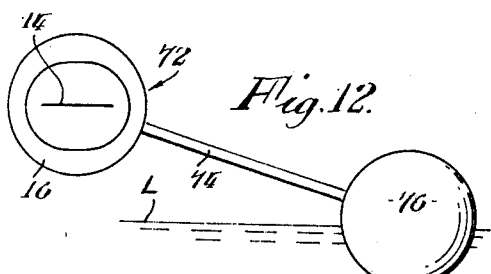
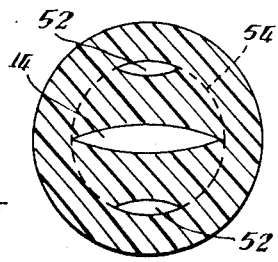
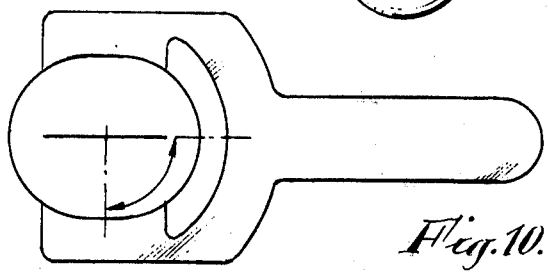
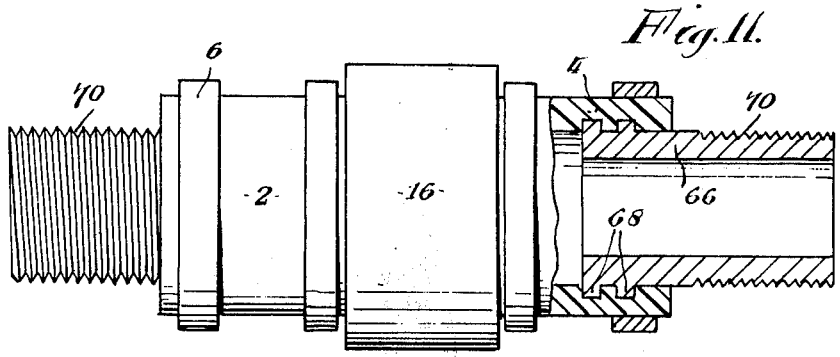

PINCH VALVE

BACKGROUND OF THE INVENTION

This invention relates to valves, sometimes known as pinch valves, in which a tubular resilient member provides a passage for the flow of fluid through the valve and is arranged to have its opposed side walls squeezed together to control the flow through said passage.

Such valves have the advantage that the valve can be closed without the use of sliding seals which may wear and allow leakage from the valve. But the reliability of the valve over long periods is also affected by the pressure force that is applied to the tubular member to hold the valve passage closed and the effect that this can have on the eventual re-opening of the passage. It is for example possible that after the valve passage has been closed for a long period it may not reopen or not reopen fully when the closing pressure is released, whether due to adherence of the contacting passage walls to each other or due to the material of the tubular member acquiring a permanent deformation or set.

An arrangement has been proposed in which a series of individual elements are fixed to the tubular member at angularly spaced positions and are displaced radially to open and close the valve but this requires a complex and therefore expensive mechanism to co-ordinate their movements.

SUMMARY OF THE INVENTION

It is an object of the present invention to provide a valve in which such difficulties can be reduced or avoided in a simple manner and in a valve according to the invention, in which at least one passage through a resilient valve member is opened and closed by deformation of the body, there is provided an outer control member rotatable relative to the valve member between alternative positions in which it engages the valve member to maintain said passage or passages open and closed respectively.

The control member thus positively urges the valve member to its open state as well as its closed state and, since this is done by relative rotation of the members, there is no need to provide a complex mechanism with a multiplicity of moving parts.

The control member may be in the form of a yoke or U-shape member the opposite arms of which comprise elements bearing on diametrically opposite portions of the valve member, or it may be convenient for the control member to be in the form of a closed ring, with said elements forming regions of reduced radius on the inner periphery of the ring. In each instance, the control member may bear directly on the valve member or there can be intermediate means, in particular rolling elements for the reduction of friction, transmitting the bearing force from the control member to the valve member.

Advantageously, means are provided to limit the relative rotation between the control member and the valve member whereby opposite end positions of said movement define the open and closed states of the valve.

The resilient valve member can conveniently comprise a moulding having end portions for connection with a pipeline and between said end portions an intermediate portion containing said passage or passages in a transversely elongated form that facilitates complete closure under pressure. The intermediate and end portions may be formed integrally with each other or said intermediate portion defining the valve closure passages can be formed by an insert in an intermediate region of an outer sleeve, the end regions of said sleeve then providing the means for connecting the valve into a pipeline.

BRIEF DESCRIPTION OF THE DRAWINGS

The invention will be more particularly described by way of example with reference to the accompanying drawings, wherein:

FIG. 1 is an axial cross-section of a valve according to the invention,

FIGS. 2 and 3 are transverse cross-sections on the line A—A in FIG. 1 showing the valve in its open and closed states respectively, FIG. 4 illustrates in transverse cross-section a modification of the valve of FIGS. 1 to 3, FIGS. 5 and 6 are axial and transverse cross-sections respectively of another valve according to the invention, FIG. 7 illustrates a modification of the valves in the preceding figures, FIG. 8 is a sectional view on the line B—B in FIG. 7, FIGS. 9 and 10 illustrate some further modifications of the valve in the preceding figures, FIG. 11 is an axial section of an end connection for a valve according to the invention, and FIG. 12 illustrates the use of a valve according to the invention in a liquid level control arrangement.

DESCRIPTION OF THE PREFERRED EMBODIMENTS

Referring to FIG. 1, the valve is of tubular form comprising an outer sleeve 2 having end portions 4 for connection by conventional circumferential clips 6 to inlet and outlet conduits 8, 10, and an inner valve body 12 intermediate the end portions 4 within the sleeve. The sleeve and body are of a flexible, resilient material such as rubber or a resilient plastics material, and can be separately formed to be subsequently bonded together, or the complete valve tube comprising the body can be moulded as an integral unit. The body has a passage 14 extending through it which has an elongated transverse cross-section with the remote ends on the major axis of that cross-section each having a small-angled "V" shape. Conveniently, the major axis of the passage cross-section extends diametrically of the valve body and if the body is formed separately from the tube it can be made as two similar parts that define the passage between them.

A control member in the form of a ring 16 surrounds and engages the sleeve 2 in the region of the valve body 12 and is retained axially by ribs or other projections 18 on the sleeve. Whereas the sleeve and body together have a circular external cross-section when unrestrained, the control ring has a non-circular internal cross-section, conveniently of an approximately elliptical or oval form, in which the minor diameter is less than the outer diameter of the unrestrained valve tube. Preferably, the internal cross-sectional area of the ring is slightly less than the combined cross-sectional area of the outer sleeve 2 and inner body 12 without the passage 14.

In use, the valve tube is held non-rotatably by the connection with the conduits 8, 10 while the ring is rotatable between respective end positions shown in FIGS. 2 and 3. In the position shown in FIG. 2, the minor axis of the ring cross-section is coincident with the major axis of the passage 14 and the rigid ring therefore applies a compression force to the valve tube forcing the sides of the passage apart. The major axis of the ring can be so selected that in this state the tube is deformed into contact with the ring around the complete inner circumference of the ring.

When the ring is rotated to the position in FIG. 3, its minor axis is now coincident with the major axis of the ring and the valve tube is deformed to close the passage 14 completely, this action being facilitated by the angulate form of the remote ends of the passage cross-section. Means may be provided to limit the movement of the ring to the 90° range of displacement between the indicated end positions. This is illustrated as a modification in FIG. 4 where the projections 18 are shown in the form of diametrically opposite pins or lugs and axial projections 22 on the control member determine the limits of rotation by abutment therewith.

It will be noted that in both the illustrated conditions the ring bears on diametrically opposite portions of the tube to urge the aperture open and closed respectively. By virtue of the force applied by the ring in the open state of the valve shown in FIGS. 2 and 4, it is possible to reduce the risk of the valve remaining closed due to adhesion between the opposed faces of the passage, as might occur in some conditions when the faces are held in close contact for a prolonged period.

The rotation of the control ring may be by hand, in which case its outer surface can be suitably contoured to provide a finger grip, or by mechanical or power means (not shown).

FIGS. 5 and 6 illustrate a modified form of the valve of FIGS. 1 and 3, the individual differences in this second embodiment being each applicable to that first-described embodiment.

In this second example, the valve sleeve and body illustrated as an integrally formed valve tube 30 and to improve fluid flow the central body portion 12a has tapering end regions 32 providing a gradual change of cross-section between the end portions 4 and the valve passage 14. Control ring 36 is provided with an integral operating lever 34 and is located on the valve tube by recesses 38 in the tube moulding receiving radially inward projections 40 on the inner periphery of the control ring. These co-operating elements prevent axial movement of the ring and also limit the rotation of the ring to a 90° movement between end positions at which, as described above, the aperture is urged to its open and closed states respectively.

It will be understood that to ease the movement of the control member the contacting parts should have a relatively low co-efficient of friction; for example with a smooth moulded rubber surface on the tube, the control member can be made of nylon or rigid polyvinylchloride. It is also possible to provide a coating of anti-friction material at the interface.

As a further possibility, rolling elements such as balls or rollers can be interposed between the control member and the valve sleeve to transmit the bearing force therebetween. This is exemplified in FIGS. 7 and 8 which illustrate a control member in the form of a ring 46 that can be used in each of the preceding embodiments and that has a series of rollers 42 projecting from its radially inner face to engage the valve sleeve (not shown). The rollers are supported by integral spindles 44 mounted in bushing rings 48 that extend around and are recessed into the radially inner face of the control member 46, the bushing rings holding the rollers captive on the control member.

FIG. 9 shows a further modified form of valve member that can be employed in the examples already described. This valve member has additional passages 52 each of elongated cross-section and arranged side-by-side with the diametrically disposed passage 14, all the passages having a similar shape when open, as illustrated, and the major cross-sectional axes of all three passages being parallel. It will be understood that by use of the control means already described all three passages will open and close together. The valve tube can be formed as a unitary moulding or can comprise an outer sleeve in which an internal body is bonded, the interface between this and the sleeve being indicated by the broken line 54 in FIG. 9, from which it will be clear that all three passages 14, 52 can be formed by spaces between the elements of the valve tube with suitable shaping of a pair of body parts. It will be appreciated that other arrangements with two or more passages can be provided.

It may be noted that in the examples of the invention that have been described the whole or the main bearing pressure between the control ring and the valve body or sleeve occurs at diametrically opposite regions which, if the pressure is applied adjacent the angulate ends of the valve passage uges the passage open and which if applied transversely thereto urges the passage closed. From this it will be appreciated that in many instances it is not necessary to employ a control ring that completely encircles the valve body and FIG. 10 shows a control member in the form of an open ended yoke or fork 56 employed to apply the control force in this manner through end portions 58. It will be understood that this modification can also be employed in any of the examples already described, for example incorporating the angular and axial location means for the control member described in any of the embodiments of FIGS. 1 to 6.

Whereas FIG. 1 shows the use of clamping rings such as clips to secure the flexible sleeve of the valve to its connecting conduits, it may be preferred in some instances to provide the valve with known rigid pipeline coupling means. For this purpose, a rigid tubular end member may be moulded into the valve tube as is illustrated in FIG. 11 where a tubular end member 66 has keying flanges 68 by means of which it is permanently secured to the end 4 the flexible sleeve of the valve member and has a screw thread 70 cut on the end projecting from the sleeve for the attachment of a pipe union.

One possible application of the invention is illustrated in FIG. 12 which shows at 72 a valve according to the invention in schematic outline and having rigidly fixed to its control ring 16 a lever arm 74, the projecting end of which carries a ball float 76. The valve may be used to control the level of liquid in a tank or reservoir, the float being shown in a position at which the valve passage 14 is held closed. With lowering of the liquid level L, the descent of the float rotates the control ring and thereby urges the passage open to allow a flow through the valve to replenish the liquid in the reservoir.

As a further possible application, the valve may comprise a suitable outlet, e.g. comprising a nozzle or other flow-smoothing means of known form, for its use as a tap or faucet. Such an arrangement may take the general form shown in FIG. 11, with one end member containing the flow-smoothing means if these are needed.

What I claim and desire to secure by Letters Patent is:

1. A valve comprising, in combination, a resilient tubular valve member, at least one transversely elongate passage through the valve member that is capable of being opened and closed by deformation of the valve member, an outer control member extending around at least a part of the periphery of the valve member and rotatable relative to the valve member about said periphery, said control member engaging different portions of the valve member periphery in respective positions of relative rotational adjustment in one of which it urges said at least one passage open and in another of which it urges said at least one passage closed.

2. A valve according to claim 1 wherein the valve member comprises a longitudinally intermediate region containing said at least one passage, and end regions extending oppositely from said intermediate region which defines a fluid conduit means of lesser cross-section than the end regions.

3. A valve according to claim 2 wherein the internal cross-section of the valve member tapers from each end region to the at least one passage in said intermediate region.

4. A valve according to claim 1 wherein said intermediate and end regions are formed integrally with each other.

5. A valve according to claim 1 wherein the valve member comprises an outer sleeve and an insert in said outer sleeve disposed intermediate its length and defining said at least one passage.

6. A valve according to claim 1 comprising a series of rolling bearing elements arranged between the valve member and the control member and transmitting the engagement forces of the control member deforming the valve member.

7. A valve according to claim 1 wherein the control member comprises elements that bear on diametrically opposite portions of the valve member to maintain said at least one passage in the respective open and closed positions.

8. A valve according to claim 7 wherein the control member is in the form of a yoke having opposite arms which provide said bearing elements.

9. A valve according to claim 7 wherein the valve member is in the form of a closed ring having a non-circular inner periphery with portions at a lesser radius providing said bearing elements.

10. A valve according to claim 9 wherein the control member has an inner surface arranged to engage a substantially continuous circumferential extent of the valve member in at least one position of the control member.

11. A valve according to claim 1 further comprising means for limiting the extent of relative rotation between the valve member and the control member.

12. A valve according to claim 11 wherein said limiting means comprise at least one radially projecting element on one of said members and a co-operating end stop on the other of said members engageable with said projecting element.

13. A valve according to claim 1 further comprising means for relative longitudinal location of the valve member and the control member.

14. A valve according to claim 1 further comprising a lever arm secured to the control member and a float on said lever arm remote from the control member for use in a liquid level control arrangement.

15. A valve according to claim 1 having a moulded valve member and at least a rigid inlet terminal member integrally incorporated in the moulded valve member for connection of the valve to a pipeline.

* * * * *